US010013826B2

(12) United States Patent
Ouellette (10) Patent No.: US 10,013,826 B2
(45) Date of Patent: Jul. 3, 2018

(54) IDENTITY TOKEN BASED SECURITY SYSTEM AND METHOD

(71) Applicant: Sensormatic Electronics, LLC, Boca Raton, FL (US)

(72) Inventor: Jason M. Ouellette, Southbridge, MA (US)

(73) Assignee: Sensormatic Electronics, LLC, Boca Raton, FL (US)

(*) Notice: Subject to any disclaimer, the term of this patent is extended or adjusted under 35 U.S.C. 154(b) by 0 days.

(21) Appl. No.: 15/240,569

(22) Filed: Aug. 18, 2016

(65) Prior Publication Data

US 2017/0053466 A1    Feb. 23, 2017

Related U.S. Application Data

(60) Provisional application No. 62/206,599, filed on Aug. 18, 2015.

(51) Int. Cl.
*G07C 9/00* (2006.01)
*H04L 9/32* (2006.01)
*H04W 4/80* (2018.01)

(52) U.S. Cl.
CPC ..... *G07C 9/00103* (2013.01); *G07C 9/00015* (2013.01); *G07C 9/00087* (2013.01); *G07C 9/00071* (2013.01); *G07C 2209/02* (2013.01); *H04L 9/3234* (2013.01); *H04W 4/80* (2018.02)

(58) Field of Classification Search
CPC ............ G07C 9/00103; G07C 9/00015; G07C 9/00087
See application file for complete search history.

(56) References Cited

U.S. PATENT DOCUMENTS

| 9,197,414 B1 * | 11/2015 | Martin ................. H04L 9/0822 |
|---|---|---|
| 2005/0278547 A1 | 12/2005 | Hyndman et al. |
| 2008/0046984 A1 | 2/2008 | Bohmer et al. |
| 2013/0212248 A1 | 8/2013 | Neafsey et al. |

(Continued)

OTHER PUBLICATIONS

International Search Report and Written Opinion, dated Nov. 22, 2016, from International Application No. PCT/US2016/047563, filed on Aug. 18, 2016. Twelve pages.

(Continued)

*Primary Examiner* — Kabir A Timory
(74) *Attorney, Agent, or Firm* — HoustonHogle LLP (57) ABSTRACT

An identity token based access control system and method is disclosed. A distributed security system that manages access to business and/or governmental entities creates an identity credential for a user and obtains or generates a globally unique identity token for the user, and loads the identity credential and the identity token onto a user device. The user then presents the user device including the identity credential and the identity token to an access control system (ACS) of the security system of the business entity that generated the identity token to obtain access to its security system, or to an ACS of a security system of one or more third party business entities that support the use of identity tokens to obtain access to the security systems of the third party business entities. The identity tokens are preferably random numbers or strings. The identity credentials typically include biometric information for users.

16 Claims, 7 Drawing Sheets

(56) References Cited

U.S. PATENT DOCUMENTS

2016/0055692 A1 2/2016 Trani
2016/0057626 A1* 2/2016 O'Toole ............... H04W 12/08
                                                                             726/4

OTHER PUBLICATIONS

International Preliminary Report on Patentability, dated Mar. 1, 2018, from International Application No. PCT/US2016/047563, filed on Aug. 18, 2016. 8 pages.

* cited by examiner

IDENTITY TOKEN BASED SECURITY SYSTEM AND METHOD

RELATED APPLICATIONS

This application claims the benefit under 35 U.S.C. § 119(e) of U.S. Provisional Application No. 62/206,599, filed on Aug. 18, 2015, which is incorporated herein by reference in its entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (Wits), and door controllers, to list a few examples.

The access control readers are often installed throughout the buildings to control access to restricted areas, such as the buildings themselves or areas of the buildings or resources within the buildings such as computer systems or elevators. The access control readers authenticate identities of (or authorize) users and then permit those authenticated users to access the restricted areas. In one example, users interact with the access control readers by swiping keycards or bringing contactless, smart cards within range (approximately 2-3 inches or 5 centimeters) of a reader. In another example, users present credential information such as usernames and passwords stored on fobs or mobile phones of the users, which wirelessly communicate their credential information to the access control readers when the mobile phones are within range of a threshold area of the building. See "Method and system for access control proximity location," US Non-Provisional application Ser. No. 14/605,165 filed Jan. 26, 2015, now U.S. Pat. Pub. No US 2016/0055692 A1, which is incorporated herein by this reference in its entirety.

The access control readers read or receive the user credential information from the keycards or mobile phones and then the access control systems determine if the users are authorized to access the restricted areas. If the users are authorized to enter the restricted areas, then the access control readers allow access to the restricted areas by unlocking locked doors, signaling that doors should be unlocked, or not generating alarm upon unauthorized user entry, for example.

SUMMARY OF THE INVENTION

Premises security systems installed in business settings, municipal and government buildings, and residential dwellings typically create their own version of electronic credentials for users that enable the users to obtain access to their respective premises. While some companies and government agencies provide the ability for users to gain access to multiple buildings or sites connected to the same enterprise network using the same electronic credential, the scope of access provided by an electronic credential is limited to those sites within the domain and under control of the same entity that generated the credential and often does not cross the enterprise network boundaries of other companies, residential buildings, etc.

The present invention provides an identity token based access control and security system. The security system generates a globally unique identity token for a user, and loads the identity token such as the actual token or a representation of the token as part of an electronic and/or physical identity credential onto a user device of the user or onto a keycard, for example. The user can then either present the user device including the electronic and/or physical identity credential to an access control system (ACS) of the security system of the business entity that generated or requested the generation of the identity token to obtain access to its security system, or to the ACS of a security system of one or more third party business entities that support the use of identity tokens to obtain access to the security systems of the third party business entities.

In operation, the users will typically present their electronic and/or physical identity credential, to an access control reader of the ACS, which reads the user's credentials. In one embodiment, the access control reader might include a keycard reader. To obtain access to areas controlled by the ACS, the user swipes their keycard at the keycard reader, which reads the credentials from the keycard. In another example, the access control reader includes a positioning unit that receives the user's credentials in a wireless fashion from a device carried by the user. The user devices include portable computing devices that preferably support the Bluetooth Low Energy (BLE) protocol such as fobs, mobile phones and tablet devices, in examples.

The electronic and/or physical identity credential for each user includes the globally unique identity token for the user and/or a locally generated credential that is specific to the access control system of the company to which the user wishes to obtain access. The locally generated credentials might include identity information that can be independently verified such as biometric IDs (e.g. fingerprint, iris scan, hand vein pattern) and passport number, driver's license number, in examples. The globally unique identity token generated for each user, in contrast, preferably provides no intrinsic information about the user and might be a random number and/or alphanumeric string.

The security system of the business entity or company that generates the identity tokens includes a cloud based token identity service that provides the identity tokens to security systems of third party business entities, which function as clients of the cloud based token identity service. The company or business entity that generates the identity tokens is the sole entity or authority that manages and stores the identity tokens.

In general, according to one aspect, the invention features a distributed security system. In one embodiment, the distributed security system includes an access control system that controls access to an access point of a first entity based on identity credentials presented by user devices of users. The distributed security system also includes a local identity issuance service of the first entity that loads the identity credentials onto user devices and globally unique identity tokens, and a token issuance service. The token issuance service provides the globally unique identity tokens to the local identity issuance service for the users.

Preferably, the globally unique identity tokens are random numbers or strings. In one implementation, the access control system receives the identity credentials wirelessly from the user devices, such as with Bluetooth Low Energy (BLE) signals. In examples, the identity credentials include biometric information for the user and include challenge questions and matching answers.

The distributed security system can further comprise an access control system that controls access to an access point of a second entity based on identity credentials presented by user devices of users, and a local identity issuance service of the second entity that loads the identity credentials onto user devices and the globally unique identity tokens from the token issuance service. For this purpose, in one example, each of the first entity and the second entity has a respective local identity enrollment location at which the users present credentials to obtain the identity credentials. Typically, the presented credentials include biometric information.

The local identity issuance service of the second entity will often perform a lookup of the identity credentials of the users against the token identity service to determine whether the users are valid users of the first entity. The local identity issuance service of the second entity then extracts the globally unique identity tokens from the identity credentials and then creates a new association between the globally unique identity token and a locally created credential for the second entity.

In general, according to another aspect, the invention features a distributed security method. The method comprises providing an access control system that controls access to an access point of a first entity based on identity credentials presented by user devices of users. The method also comprises using a local identity issuance service of the first entity, and provides the globally unique identity tokens to the local identity issuance service. The method uses the local identity issuance service of the first entity to load the identity credentials onto user devices and globally unique identity tokens, and provides the globally unique identity tokens to the local identity issuance service for the users from a token issuance service.

In general, according to yet another aspect, the invention features a distributed security system. The distributed security system includes a token identity service that creates globally unique identity tokens for identifying persons, a first entity that subscribes to the token identity service, and a second entity that subscribes to the token identity service. The first entity creates a first local identity credential from the globally unique identity token for a person, where the first local identity credential enables the person to obtain access to an access control system of the first entity. The second entity then creates a mapping between the globally unique identity token and a second local identity credential that enables the person to obtain access to an access control system of the second entity.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
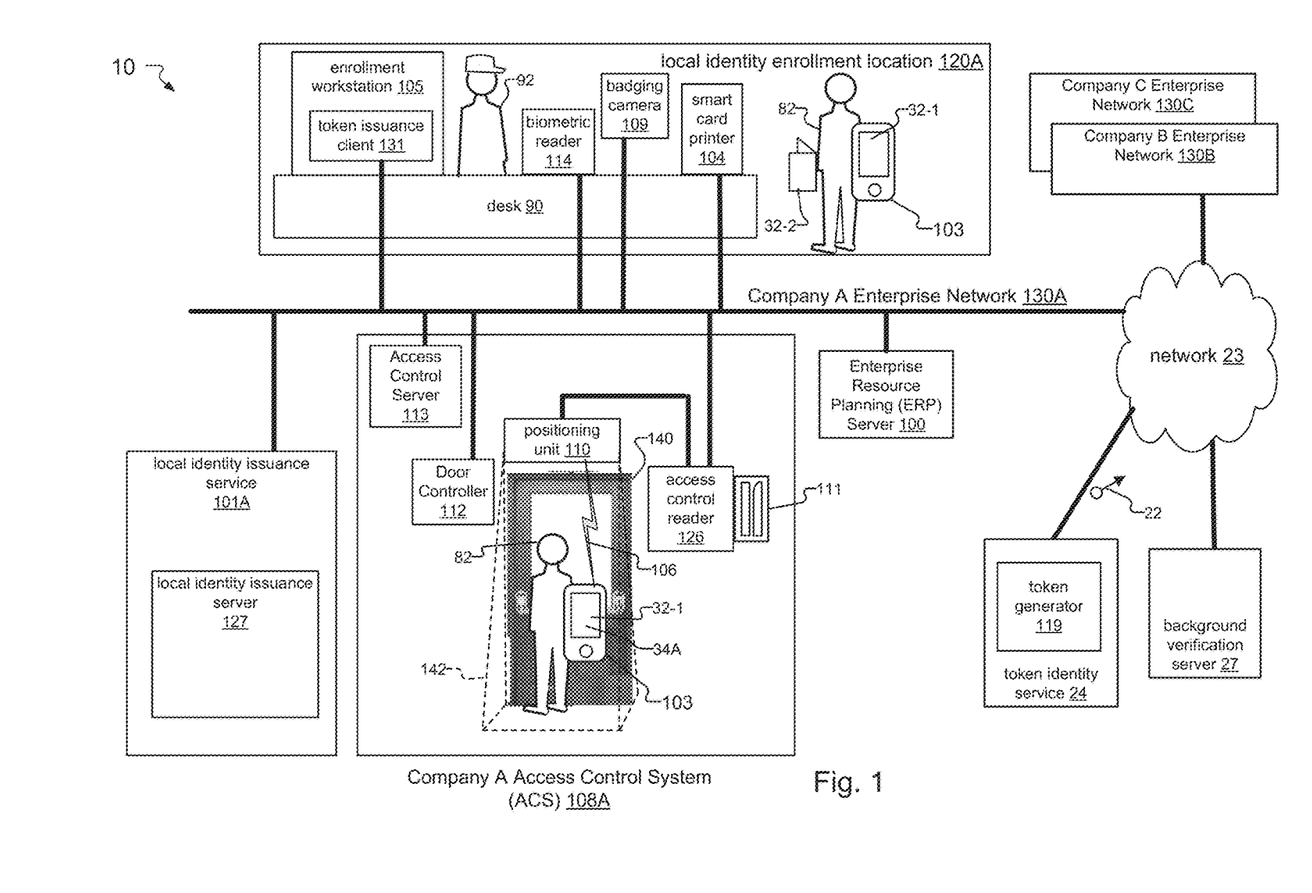
FIG. 1 is a schematic block diagram of a distributed security system that incorporates principles of the present invention, where the system verifies credentials of a person arriving at Company A, and upon verification of the user's credentials, the system obtains and/or assigns to the user a globally unique identity token that represents the user's identity, and where an electronic and/or physical identity credential that includes the globally unique identity token is created for the person which enables the person to obtain access to an access control system of Company A.

FIG. 1 shows a distributed security system 10. The system 10 verifies credentials of a person arriving at exemplary business entity Company A.

Within the distributed security system 10, various systems and components communicate over company A's enterprise network 130A. Enterprise network 130A enables communications between a local identity enrollment location 120A, a local identity issuance service 101A, an Access Control System (ACS) of Company A 108A, and a local enterprise resource planning (ERP) server 100, also known as a Record of Authority. However, cloud-based ERP systems can be used in other embodiments.

The enterprise network 130A communicates with external networks and systems via a network 23. In one example, network 23 is a public network such as the internet. A token identity service 24, including a token generator 119, and a background verification server 27 connect to network 23 and communicate with the components of the enterprise network 130A via the network 23. Preferably, the access control system 108A is a frictionless access control system.

Enterprise networks 130B and 130C of Companies B and C also connect to network 23 and communicate with the enterprise network 130A of Company A. Enterprise networks 130B and 130C of Companies B and C are also clients of the token identity service 24 of Company A.

In addition, the local identity issuance service 101A includes a local identity issuance server 127.

The ERP system 100 includes user accounts of users 82. ERP refers to business process management software that allows an organization such as Company A to use a system of integrated applications to manage user details of its users 82.

In one example, the ERP 100 is provided by Workday, Inc. In one example, the background verification server 27 is provided by Quantum Secure, Inc.

The token generator 119 generates a globally unique identity token ID 22 for each user 82. In examples, the globally unique identity token ID 22 is an opaque numerical ED or an opaque alphanumeric ID, where an opaque identifier provides no information about the item it identifies other than it being a seemingly random string or number.

In the illustrated example, the ACS 108A includes an access control server 113, a door controller 112 and an access control reader 126. In one embodiment, the access control reader 126 includes a keycard reader 111 for reading credentials from keycards. The access control reader 126 might alternatively or additionally include a positioning unit 110.

In one example, the positioning unit 110 includes one or more BLE antennas which receive the credentials 32 wirelessly from the BLE-enabled user device 103 carried by the user 82. The keycard reader 111 and/or positioning unit 110 forward the credentials presented by the user to the access control reader 126, which in turn forwards the credentials over the enterprise network 130A to the access control server 113.

The positioning unit 110 monitors and defines a threshold area 142 near a door 140 or other access point that provides access to the premises of company A. When the user device 103 carried by the user 82 is located near or within the threshold area 142, wireless signals 106 such as Bluetooth Low Energy (BLE) signals can be exchanged between the positioning unit 110 and the user device 103. For this purpose, the user device 103 is preferably a peer BLE communicating device carried by a user 82, such as a BLE-capable mobile phone or fob 103. In one example, the user device provides electronic identity credentials 34 to the ACS 108A to enable the authentication of its user. Further, the positioning unit 110 uses the wireless signals to determine whether the user and specifically their user device 103 is located within the threshold area 142.

The local identity enrollment location 120A allows users 82 such as employees of company A to present their credentials 32 and have data from those credentials entered onto company A's enterprise network 130A. The credentials can be either in physical form such as a passport 32-2 carried by the user 82, or in electronic form, such as a user ID 32-1 for a user stored in an access keycard or user device 103, in examples. A security guard 92 at desk 90 instructs the individual 82 to present their credentials directly to the security guard 92, or to present their credentials via a badging camera 109 and/or biometric reader 114-1, in examples. In one possible implementation, a smart card printer 104 prints smart cards that include the user ID 32-1.

In one example, the biometric reader 114 is a biometric enrollment platform provided by ago, Inc. The security guard 92 then enters the provided credentials via an enrollment workstation 105.

The enrollment workstation 105 includes a token issuance client 131. The enrollment workstation 105, biometric reader 114-1, smart card printer 104, and badging camera 109 also communicate with one another over the enterprise network 130A. The enrollment workstation 105 also presents a client interface to the security guard 92 that enables access to the background verification server 27. In one implementation, the enrollment workstation 105 and background verification server 27 form a SAFE cloud based client/server physical identity verification system.

The local identity issuance service 101A creates electronic and/or physical identity credentials 34 for users 82. The local identity issuance service 101A will further load the electronic identity credentials 34 onto user devices 103 of users 82. User devices 103 include mobile phones and tablet devices, in examples. Persons carrying the user devices 103 or ID cards, which in turn include the electronic and/or physical identity credentials 34, present the electronic and/or physical identity credentials 34 at the ACS 108A for Company A to enter areas within the premises of Company A controlled by the access point 140.

Figure 2:
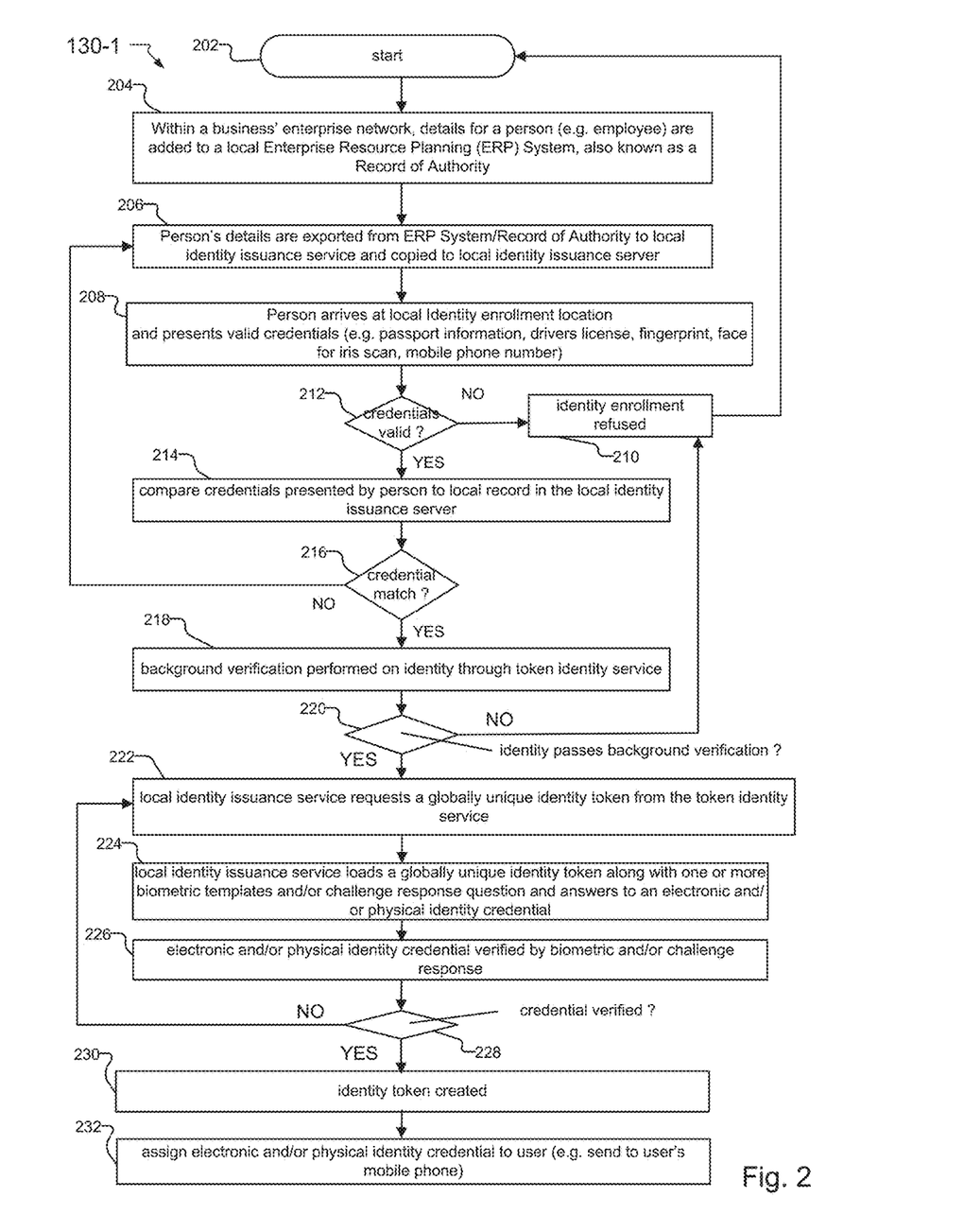
FIG. 2 is a flow chart describing a method of the distributed security system in FIG. 1 for creating the electronic and/or physical identity token for the person to obtain access to the access control system of Company A.

FIG. 2 describes a method for creating an electronic and/or physical identity credential 34 for a user. The method starts in step 202.

In step 204, within the enterprise network 130A of a business such as Company A the person's details such as personal information 30 are added to the local ERP/Record Of Authority 100. According to step 206, the person's details are exported from the ERP/Record of Authority 100 to the local identity issuance service 101A and a copy is saved to the local identity issuance server 127.

Then, in step 208, the person 82 arrives at the local Identity enrollment location 120A and presents valid credentials 32 (e.g. Passport 32-2, Driver's License, fingerprint, face for iris scan, mobile phone number, in examples). In step 212, the method checks if the presented user credentials 32 are valid. If the credentials are not valid, the identity enrollment is refused in step 210 and the method transitions back to step 202. Otherwise, the method transitions to step 214.

According to step 214, the credentials 32 are compared to the local record for the user in the local identity issuance server 127. If the credential 32 is not matched in step 216, the method transitions back to step 206. If the credential 32 is matched in step 216, the method transitions to step 218.

In step 218, background verification is performed on the identity through the token identity service 24. The token identity service 24 communicates with the background verification server 27 for this purpose. If the identity passes the background verification in step 220, the method transitions to step 222. If the identity does not pass the background verification in step 220, the method transitions to step 210 and the identity enrollment is refused.

According to step 222, the local identity issuance service 101A requests a globally unique identity token 22 from the token identity service 24. In step 224, the local identity issuance service 101A loads a globally unique identity token 22 along with one or more biometric templates 36 and/or challenge response questions and answers to create an electronic and/or physical identity credential 34. The electronic and/or physical identity credential 34 includes a locally created credential 32-3A, the globally unique identity token 22, and the biometric templates or data 36 and/or challenge response questions and answers. The locally created credential 32-3A is relevant only to the ACS 108A of Company A.

In step 226, the electronic and/or physical credential 34 is verified by biometric and/or challenge response. If the verification of the electronic and/or physical credential 34 is successful in step 228, the method transitions to step 230 to indicate that creation of the electronic and/or physical credential 34 was successful. If the verification is not successful, the method transitions back to step 222.

In step 232, the method assigns the electronic and/or physical credential 34 to the user 82.

Figure 3:
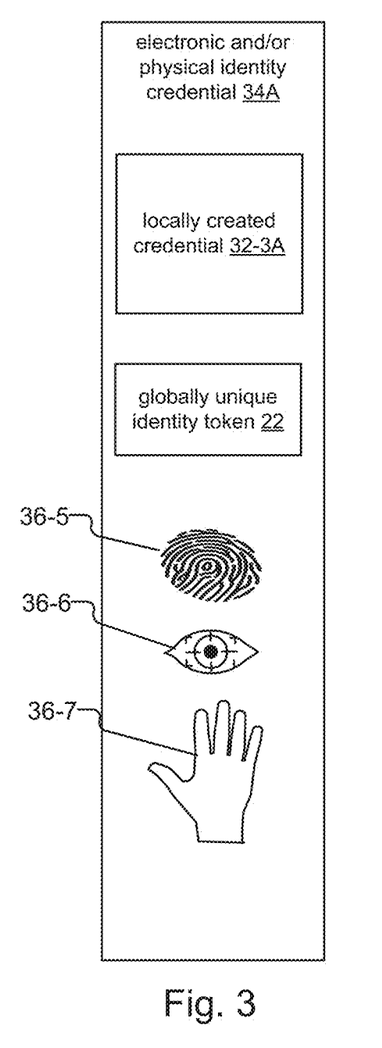
FIG. 3 is a block diagram showing detail for the electronic and/or physical identity credential created for the user in accordance with the method of FIG. 2.

FIG. 3 shows an exemplary electronic and/or physical credential 34A for a user to obtain access to an ACS 108A of Company A, created in accordance with the method of FIG. 2. The electronic and/or physical credential 34A includes a globally unique identity token 22, a locally created credential 32-3A for Company A, and biometric templates 36 and/or challenge response questions and answers. Exemplary biometric templates 36-5, 36-6, and 36-7 are shown for fingerprint, iris scan, and hand scan of the user 82, respectively. In this way, the globally unique identity token 22 is mapped to the locally created credential 32-3A for a specific business or governmental entity (Company A).

Figure 4:
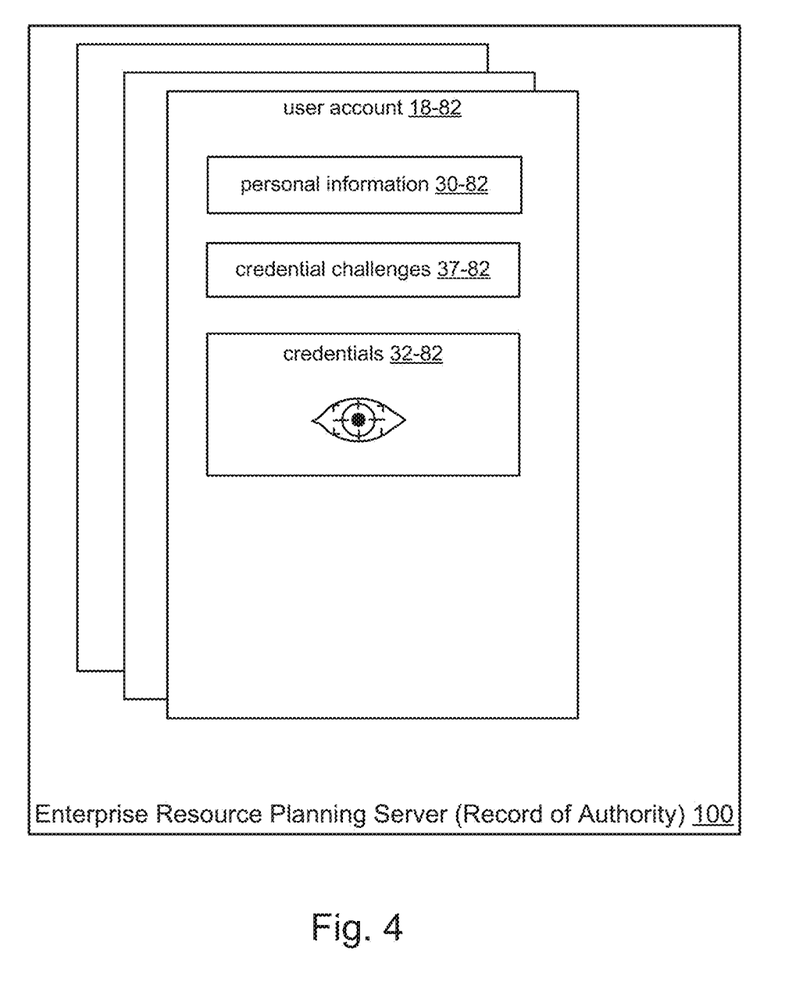
FIG. 4 is a block diagram showing detail of an Enterprise Resource Planning Server (ERP) in the distributed security system of FIG. 1.

FIG. 4 provides detail for user accounts 18 of users 82 within the ERP 100. An exemplary user account 18-82 for user 82 is shown. In examples, the user account 18-82 includes personal information 30-82, credential challenges 37-82, and credentials 32-82. In one example, a credential challenge 37 includes one or more challenge questions and matching answers.

Figure 5:
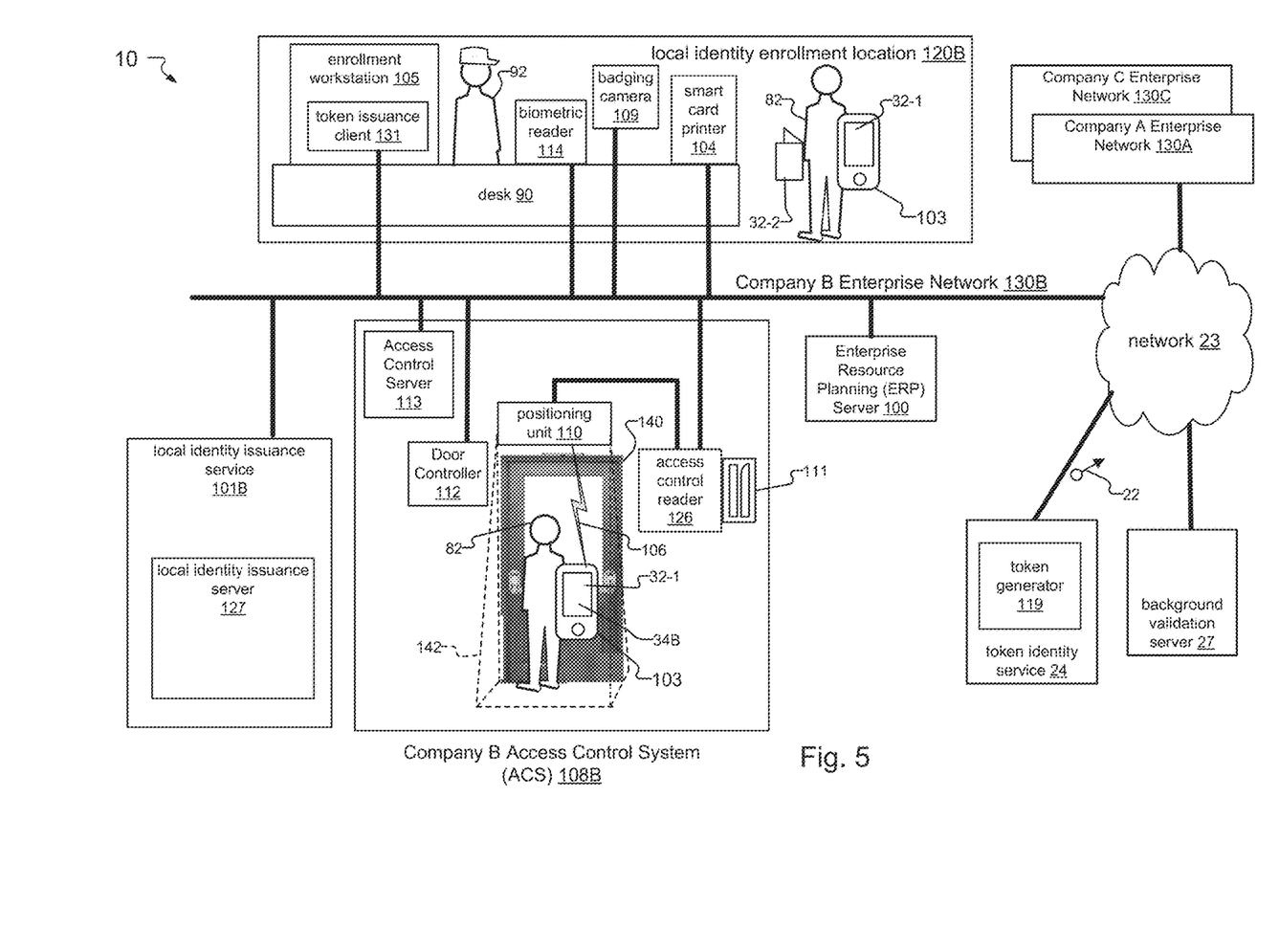
FIG. 5 is a schematic block diagram of the distributed security system in the context of another business Company B, where Company B is a client of a token identity service of Company A or a third party, and where the same person in FIG. 1 presents the globally unique identity token created in FIG. 2 to obtain access via an access control system of Company B.

FIG. 5 shows the distributed security system 10 in the context of a different business entity, for exemplary business entity Company B. The components of Company B that communicate over the enterprise network 130B of Company B are substantially similar to those of Company A in FIG. 1. Here, the same person 82 that obtained access to the ACS 108A of Company A is attempting to access the ACS 108B of Company B, using the electronic and/or physical identity credential 34A created in the method of FIG. 2. Though the user 82 is not currently a valid user of the ACS 108B of Company 13, the user 82 can present the electronic and/or physical credential 34A created in FIG. 2 to enroll the same user 82 at the ACS 108B of Company B.

For this purpose, the distributed security system 10 in the context of Company B first verifies that the user 82 is a valid user of the ACS 108A of Company A via the token identity service 24 of Company A. Once the user 82 is verified as a valid user of the ACS 108A of Company A, the security system 10 in the context of Company B then extracts the globally unique identity token 22 from the electronic and/or physical identity credential 34A, and creates a mapping between the globally unique identity token 22 and a new electronic and/or physical credential 34B created for the user at the ACS 108B of Company B. The new electronic and/or physical credential 34B will then enable the user to obtain access to the ACS 108B of Company B.

Using a specific example, an electronic and/or physical credential 34A including a globally unique identity token 22 is generated for an employee user 82 of Company A. The user 82 might later become an employee of or want to visit with another governmental or business entity (company B). The user 82 then presents his electronic and/or physical credential 34A at the local identity enrollment location 120B of Company B. Because Company B is a client of the token identity service 24, Company B can execute a lookup of the electronic and/or physical credential 34A against the token identity service 24 to determine whether the user is a valid user of Company A's ACS 108A. If the token identity service 24 determines that the user 82 is a valid user of Company A, the local identity issuance service 101B in Company B can then extract the globally unique identity token 22 from the electronic and/or physical credential 34A, and create a new association or mapping between the globally unique identity token 22 and a locally created credential 32-3B that is valid only for Company B. The local identity issuance service 101B then creates an electronic and/or physical credential 34B that includes the globally unique identity token 22 for the user 82 and a locally created credential 32-3B that is relevant only to the ACS 108B of Company B.

It can also be appreciated that the token identity service 24 can be owned and operated by a third party entity that is separate and distinct from the entities that own and manage the distributed security system 10 at Company A and Company B. In such an embodiment of the distributed security system 10, Company A and Company B are subscribers to the token identity service 24. The token identity service 24 creates a globally unique identity token 22 for each user 82.

Within each Company or entity, such as within Company A, a local identity issuance service 101A can create an electronic and/or physical identity credential 34 for each user that includes the globally unique identity token 22 for the user. This electronic and/or physical identity credential 34A is then used to obtain access to ACS 108A for that Company A. The electronic and/or physical identity credential 34A also includes a locally created credential 32-3A which is relevant only to the ACS 108A of Company A.

Alternatively, a different Company or entity such as Company B can utilize the token identity service 24 in conjunction with the local identity issuance service 101B of Company B to enroll a user 82 at the ACS 108B of Company B based upon the local identity credential 32-3A for Company A. For this purpose, the local identity issuance service 101B of Company B can map the globally unique identity token 22 associated with the local identity credential 32-3A for Company A to a local identity credential 32-3B for Company B that the local identity issuance service 101B creates for the same user 82.

Figure 6:
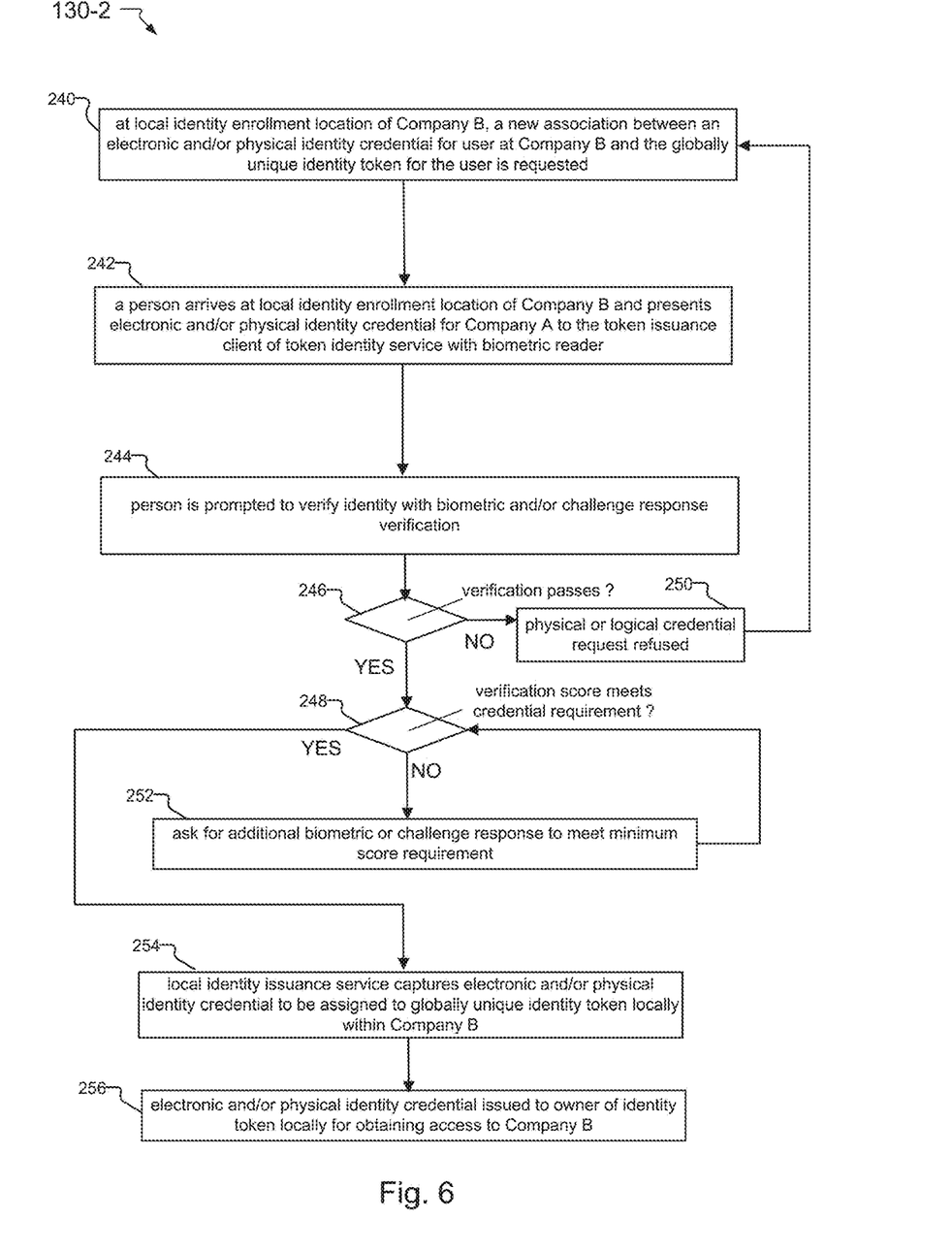
FIG. 6 is a flow chart describing a method of the distributed security system in FIG. 5 for creating an electronic and/or physical identity credential for the same person to obtain access to the access control system of Company B, where the electronic and/or physical identity credential is based upon the globally unique identity token for the user created in FIG. 2, which the user presents upon arriving at Company B.

FIG. 6 is a flow chart that describes a method of the distributed security system 10 in the context of Company B in FIG. 5. Here, a user 82 previously authorized at ACS 108A of Company A uses the electronic and/or physical identity credential 34A for Obtaining access to the ACS 108A of Company A to enroll the same user 82 at ACS 108B of Company B.

In step 240, at local identity enrollment location 120B of Company B, a new association or mapping between an electronic and/or physical identity credential 34B for user 82 at Company B and the globally unique identity token 22 for the user 82 is requested. For this purpose, in step 242, a person (e.g. user 82) arrives at local identity enrollment location 120B of Company B and presents the electronic and/or physical identity credential 34A for Company A to token issuance client 131 of the token identity service 24 with biometric reader 114.

In step 244, the user 82 is prompted to verify his/her identity with biometric and/or challenge response verification. In step 246, the method determines if verification passes. If verification passes, the method transitions to step 248. For this purpose, the token issuance client 131 sends the electronic and/or physical identity credential 34A to the token identity service 24 to determine whether the user 82 is a valid user of the ACS 108A of Company A. The token identity service 24, in some examples, then validates the electronic and/or physical identity credential 34A by issuing an inquiry to the local identity issuance service 101A on Company A's enterprise network 130A.

If verification does not pass, the method transitions to step 250, where the method refuses the physical or logical credential request, and transitions back to step 240.

In step 248, the method determines if a verification score meets a credential requirement. If the statement is false, the method transitions to step 252, where the method asks for additional biometric or challenge response to meet the minimum score requirement and returns to step 252 to retest. This iterative process repeats until the statement (e.g. the meeting of the minimum score requirement) indicated by step 248 is true, which causes the method to transition to step 254.

In step 254, the local identity issuance service 101B captures a locally created Physical and/or Logical credential 32-3B to be assigned to the globally unique identity token 22 locally within Company B.

Finally, in step 256, an electronic and/or physical identity credential 34B is issued to owner of identity token 20 locally for obtaining access to the ACS 108B of Company B.

Figure 7:
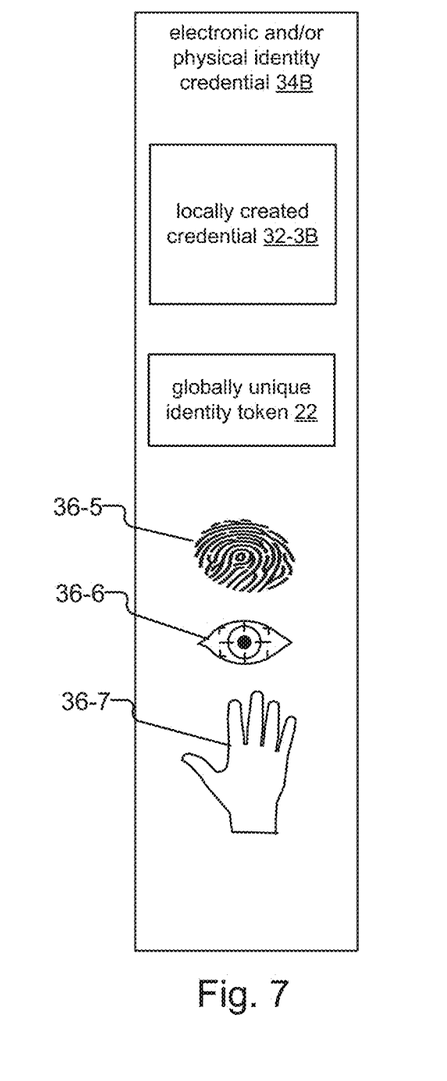
FIG. 7 is a block diagram showing detail for the electronic and/or physical identity credential created for the user in accordance with the method of FIG. 6.

FIG. 7 shows an exemplary electronic and/or physical credential 34B for a user to obtain access to an ACS 108B of Company B, created by the method of FIG. 6. The electronic and/or physical credential 34B includes a globally unique identity token 22, a locally created credential 32-3B for Company B, and biometric templates 36 and/or challenge response questions and answers. Exemplary biometric templates 36-5, 36-6, and 36-7 are shown for fingerprint, iris scan, and hand scan of the user 82, respectively.

While this invention has been particularly shown and described with references to preferred embodiments thereof, it will be understood by those skilled in the art that various changes in form and details may be made therein without departing from the scope of the invention encompassed by the appended claims.

What is claimed is:

1. A distributed security system, comprising:
    an access control system that controls access to an access point of a first entity based on identity credentials presented by user devices of users;
    a local identity issuance service of the first entity that loads the identity credentials onto user devices and globally unique identity tokens;
    a token issuance service that provides the globally unique identity tokens to the local identity issuance service for the users;
    an access control system that controls access to an access point of a second entity based on identity credentials presented by user devices of users; and
    a local identity issuance service of the second entity that loads the identity credentials onto user devices and the globally unique identity tokens from the token issuance service;
    wherein the local identity issuance service of the second entity extracts the globally unique identity tokens from the identity credentials and then creates a new association between the globally unique identity token and a locally created credential for the second entity.

2. The system as claimed in claim 1, wherein the globally unique identity tokens are random numbers or strings.

3. The system as claimed in claim 1, wherein the access control system receives the identity credentials wirelessly from the user devices.

4. The system as claimed in claim 1, wherein the identity credentials are transmitted using Bluetooth Low Energy (BLE) signals.

5. The system as claimed in claim 1, wherein the identity credentials include biometric information for the user.

6. The system as claimed in claim 1, wherein the identity credentials include challenge questions and matching answers.

7. The system as claimed in claim 1, wherein each of the first entity and the second entity has a respective local identity enrollment location at which the users present credentials to obtain the identity credentials.

8. The system as claimed in claim 7, wherein the presented credentials include biometric information.

9. The system as claimed in claim 1, wherein the local identity issuance service of the second entity performs a lookup of the identity credentials of the users against the token identity service to determine whether the users are valid users of the first entity.

10. A distributed security method, comprising:
    providing an access control system that controls access to an access point of a first entity based on identity credentials presented by user devices of users;
    using a local identity issuance service of the first entity to load the identity credentials onto user devices and globally unique identity tokens; and
    providing the globally unique identity tokens to the local identity issuance service for the users from a token issuance service;
    an access control system of a second entity controlling access to access points of the second entity based on identity credentials presented by user devices of users;
    a local identity issuance service of the second entity loading the identity credentials onto user devices and the globally unique identity tokens from the token issuance service; and
    the local identity issuance service of the second entity extracting the globally unique identity tokens from the identity credentials and then creating a new association between the globally unique identity token and a locally created credential for the second entity.

11. The distributed security method as claimed in claim 10, wherein the globally unique identity tokens are random numbers or strings.

12. The distributed security method as claimed in claim 10, wherein the access control system receives the identity credentials wirelessly from the user devices.

13. The distributed security method as claimed in claim 10, wherein the identity credentials are transmitted using Bluetooth Low Energy (BLE) signals.

14. The distributed security method as claimed in claim 10, wherein the identity credentials include biometric information for the user.

15. The distributed security method as claimed in claim 10, wherein the identity credentials include challenge questions and matching answers.

16. The distributed security method as claimed in claim 10, wherein the local identity issuance service of the second entity performs a lookup of the identity credentials of the users against the token identity service to determine whether the users are valid users of the first entity.

* * * * *